INVENTORS
WILLIAM B. SHARAV
THOMAS A. COLESS
LOUIS A. PRINCE

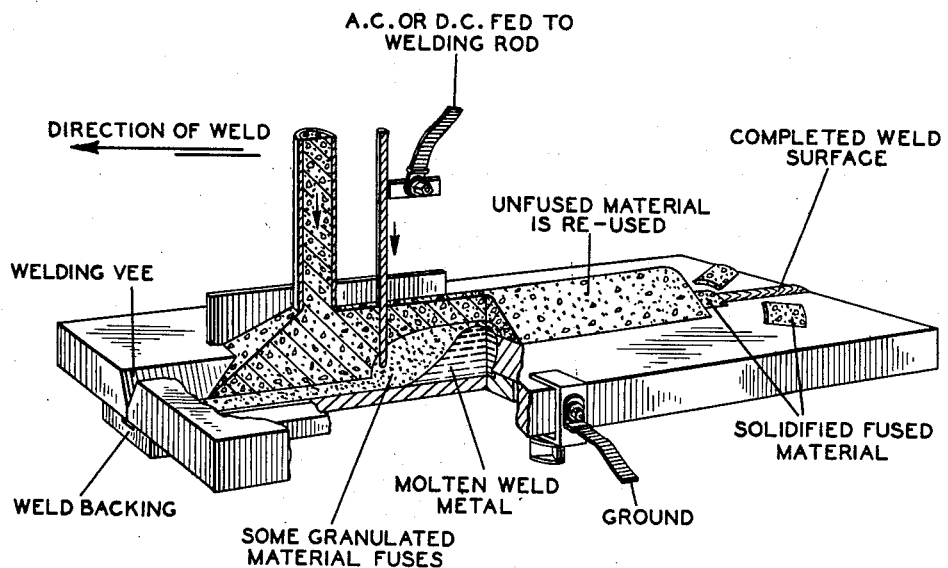
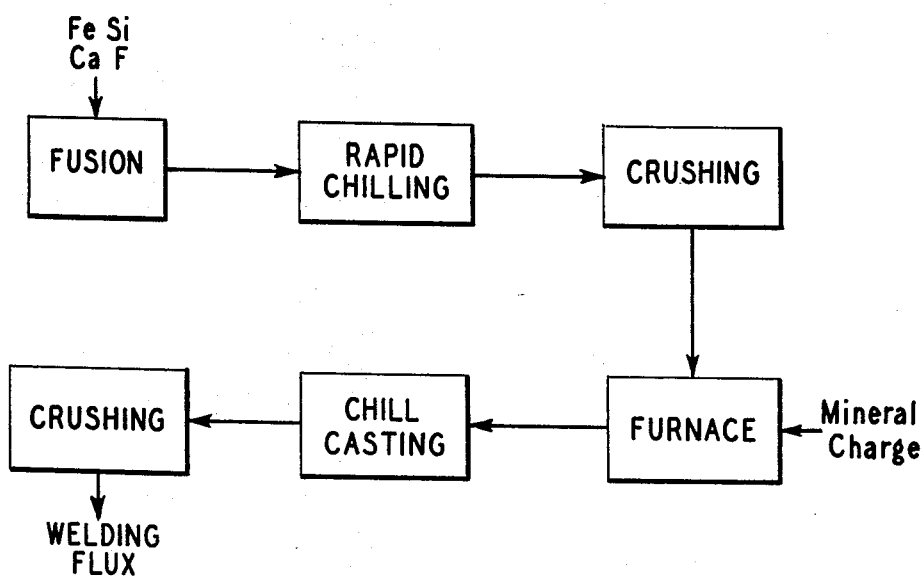

BY Barnwell R. King
ATTORNEY

Feb. 5, 1963 W. B. SHARAV ET AL 3,076,735
SUBMERGED-MELT ARC WELDING, COMPOSITION AND PROCESS
Filed Aug. 25, 1959 3 Sheets-Sheet 3

INVENTORS
WILLIAM B. SHARAV
THOMAS A. COLESS
LOUIS A. PRINCE
BY Barnwell R. King
ATTORNEY

United States Patent Office 3,076,735
Patented Feb. 5, 1963

3,076,735
SUBMERGED-MELT ARC WELDING, COMPOSITION AND PROCESS
William B. Sharav, Short Hills, Thomas L. Coless, Maplewood, and Louis A. Prince, Morristown, N.J., assignors to Union Carbide Corporation, a corporation of New York
Filed Aug. 25, 1959, Ser. No. 835,881
7 Claims. (Cl. 148—26)

This invention relates to submerged-melt arc welding and more particularly a novel composition and an improved process for making such composition.

Submerged-melt arc welding involves the fusion of metal parts under a blanket of granular fused or agglomerated materials, generally oxides and/or silicates, with and without additions of fluorides. It is also generally known that the performance of these materials can be improved by additions of deoxidizers, such as ferro-alloys. Since the densities of the ferro-alloy additions are heavier than the oxide or silicate particles of the welding composition, they have a tendency to separate when added as mechanical mixtures. The result of such separation is that the product is neither uniform nor adequate for process utilization. Tests have proven that welds made with such composition may be either under-deoxidized or overdeoxidized.

It has been a common practice to mechanically bond the ferro-alloy additions to the oxide and/or silicate materials with a bonding agent such as sodium silicate. However, such approach produces a composition which is friable to the point of crumbling. Such crumbled composition cannot be moved uniformly through conventional flux dispensers. A serious limitation of a bonded composition is that it is hygroscopic and expensive precautions have to be taken to prevent moisture contamination.

The bonded composition has the further disadvantage that metallic additions are present in their original coarse, crushed state, which condition limits the even distribution of the metallic deoxidizers throughout the composition. A still further disadvantage of the bonded composition is that such metallic deoxidizers do not penetrate the particles of the composition as is desirable to distribute the metallics in a finely dispersed condition.

In copending application, Serial No. 779,515, filed April 7, 1959, by Shrubsall et al., now Patent No. 3,031,345, dated April 24, 1962, a method of achieving a finely-dispersed metallic mist throughout the matrix of fused composition is described. However, since such finely-dispersed metallic mist is achieved by chemical reduction, such chemical process has a limitation as to the quantity of mist produced. Certain welding conditions require frequently a quantity of mist in excess of that obtainable by such chemical reduction process.

A principal object of this invention is to provide a method of uniformly dispersing deoxidizing metallic additions in a liquid bath of welding composition, such fine uniform dispersion of the metallic particles being retained after the fused material has solidified and has been crushed to a suitable size for welding purposes. In this manner the metallics so contained are well dispersed throughout the entire product and securely united with the alkaline earth silicate and not loosely adherent to the surface of the silicate base as in the sodium silicate bonded product. These finely-dispersed metallic additions range in size from submicroscopic to those visible with the naked eye.

Another object of the invention is to provide in a welding composition additional quantities of metallic mist greater than those achieved by chemical reduction in the furnace. For example, the chemical reduction process for producing metal mist would be expected to provide a maximum amount of deoxidizers not exceeding about 0.1 percent, whereas certain process requirements indicate a need for several percent metallic deoxidizers in the range of 1 to 6 percent, many times the 0.1 percent obtainable with the chemical reduction process.

Still another object is the achievement of furnacing costs, and manufacturing costs, lower than those of producing metal mist by chemical reduction. It is readily understood that where additional furnacing is required to achieve chemical reduction, additional power is required, and therefore such a process is substantially more expensive than if the deoxidizers could be added directly to the molten furnace charge. A saving in time by elimination of the additional furnacing is also a factor of importance favorable to the process of the instant invention.

The mere adding of metallic deoxidizers to molten welding materials in the furnace has not been entirely successful because the metallic additions tend to agglomerate and form a large massive fused metal globule which settles out at the bottom of the furnace, thus defeating the purposes of the metallic addition. Process techniques are needed to insure the suspension of these metallic additions in a finely divided state in the molten welding material on through final processing to the granular product used in welding.

The invention provides a method of suspending metallic deoxidizing material in submerged-melt welding composition, which comprises adding the selected metallic deoxidizing material in the form of powder the particles of which are freely separable from one another, as late furnace addition to molten welding composition just before pouring the latter, which results in uniform dispersion of particles of metallic deoxidizers throughout the fused welding composition.

The invention also provides a new two-step method for suspending metallic deoxidizers in submerged-arc welding composition. The first step of the method comprises mixing crushed ferro-silicon particles with calcium fluoride, fusing the mix at 2600° F., and then crushing the solidified mix. The latter crushed mix is in the second step then added as a late furnace addition to molten (2200 or 2600° F.) welding composition just before pouring.

Completely unexpected, the end result of the above procedure was a uniform dispersion of particles finer than in the original state throughout the fused welding composition. Also unique was the control by temperature of the size of the suspended particles: globules of suspended metallics (bath temperature about 2200° F.), or globules plus mist (bath temperature about 2600° F.) were obtained merely by addition of the mix to the molten welding composition.

In the method involving production of metal mist by chemical reduction of the welding composition, a mist was produced of less than 0.1 percent. By the subject method, the suspended metallic additions comprise about five percent of the composition.

In the drawings:

FIG. 1 is a fragmentary perspective view with parts cut-away and shown in section of a submerged-melt metal arc welding set-up in operation;

FIG. 2 is a block-flow diagram illustrating the process of making the composition of the invention;

It was found that the metallic additions could be suspended as particles in the fused welding composition by coating them with high melting point substances which would not impair weldability, and that agglomeration or oxidation of the metallic addition is prevented by such coating.

Figure 3:
FIG. 3 is an enlarged (200×) photographic plan view of crushed ferro-silicon, 50 percent grade, −80 +150 mesh.
Figure 4:
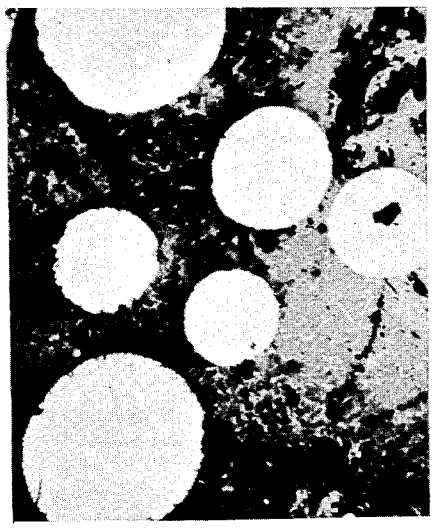
FIG. 4 is an enlarged photographic cross-sectional view of fused ferro-silicon globules suspended in fused calcium fluoride 50–50 mixture by wt.
Figure 5:
FIG. 5 is a view similar to FIG. 4 of such material crushed to —25 mesh.

A mixture of one part by weight crushed ferro-silicon (FIG. 3) (50 percent grade) and one part calcium fluoride was fused at 2550–2600° F. in a graphite crucible. FIG. 3 shows the particle size of the metallic addition before it is fused and bonded to the high melting point addition. Chilling rapidly produced a well-dispersed suspension of fused globules of ferro-silicon in calcium fluoride as illustrated in FIG. 4. This product was crushed to a —24 mesh size (see FIG. 5) and was then added as a late furnace addition to a fused manganese silicate type welding composition immediately before the composition was tapped from the furnace in the usual manner.

Figure 6:
FIG. 6 is a photograph of a sample enlarged 200× of a suspension of fine metallic particles obtained by adding material of FIG. 5 to fused welding composition at 2600° F.
Figure 7:
FIG. 7 is a view similar to FIG. 6, but including a non-disintegrated particle of metallic addition.
Figure 8:
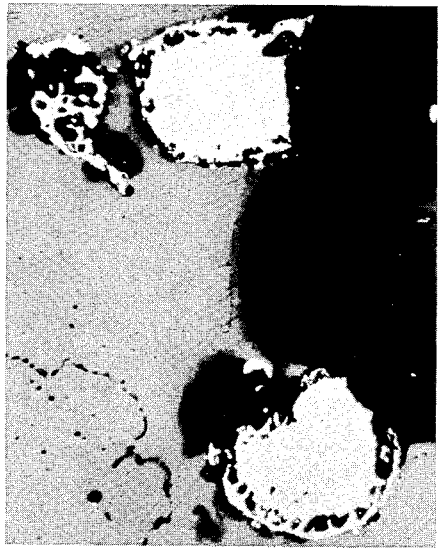
FIG. 8 is a similar view of a suspension of metallic particles in fused welding composition obtained by adding material of FIG. 5 to fused welding composition at 2200° F.

This fused composition, chill cast, contained the ferro-silicon suspensions in the mist plus globule form shown in FIG. 7. Note that FIG. 6 shows only mist particles whereas the typical product is that of FIG. 7. In FIG. 8 it is seen that, by control of temperature, no mist particles are obtained. The chill cast composition was then crushed to a 12 x 32 mesh size suitable for welding tests with highly satisfactory results. In addition to producing excellent welds, welding tests disclosed that the composition of the invention has a much higher tolerance for rust on the work than other compositions of similar or identical chemistry but containing no ferro-silicon additions.

Moreover, it was also found that the fused composition of the invention, which forms over a weld in the course of welding, detaches itself more readily than that of compositions free of conventional ferro-silicon additions. The welding compositions used in these tests were mainly manganese silicates similar to a standard commercial composition.

The original intention was to coat the metallic particles with a substance which would not be dissolved on addition to the fused melt. What was found, completely unexpectedly, was that a uniform dispersion of fine particles resulted, such particles being much smaller than the crushed metals added.

A PREFERRED PROCEDURE FOR MAKING COMPOSITION OF THE INVENTION (1) Fifty percent by weight ferro-silicon —80 +150 mesh size was blended by mechanical mixing with 50 percent by weight powdered calcium fluoride.

(2) This mixture was placed in a graphite crucible and heated to 2600° F. in an atmosphere Glow-Bar furnace. The crucible was held at temperature for an additional 30 minutes to allow the entire mixture to become molten.

(3) The molten mixture was removed from the furnace and chill cast onto a stainless steel plate. This fused material was then crushed to —24 mesh size.

(4) About 1 pound of standard fused submerged arc welding composition containing no metallics was placed in a graphite crucible and heated in an air atmosphere Glow-Bar furnace to a temperature of 2600° F. The mixture was then held an additional 30 minutes at 2600° F. The crucible was removed from the furnace and 10 percent by weight of the crushed —24 mesh ferro-silicon+calcium fluoride fused mixture was immediately added. Next the mix was stirred constantly for one minute by means of a graphite bar. The molten material was then chill-cast and ground to size.

Formulation standard composition: The approximate constituency of the fused manganese silicate type composition used to evaluate the basic idea was as follows.

Manganese Silicate

| Compound: | Percent by weight |
|---|---|
| $SiO_2$ | 35–43 |
| $MnO$ | 37–45 |
| $CaF_2$ | 2–8 |
| $CaO$ | 2–6 |
| $Al_2O_3$ | 0–4 |

The following compositions could also benefit by additions of suspended ferro-alloys or other deoxidizer metallics.

Modified Calcium Silicate Type

| Compound: | Percent by weight |
|---|---|
| $SiO_2$ | 33–42 |
| $MnO$ | 5–10 |
| $CaF_2$ | 2–8 |
| $CaO$ | 20–26 |
| $MgO$ | 8–15 |
| $Al_2O_3$ | 10–20 |

Manganese-Aluminum-Silicate Type

| Compound: | Percent by weight |
|---|---|
| $SiO_2$ | 30–38 |
| $MnO$ | 22–32 |
| $CaF_2$ | 2–8 |
| $CaO$ | 2–10 |
| $MgO$ | ---- |
| $Al_2O_3$ | 18–24 |

Magnesium Aluminum Silicate

| Compound: | Percent by weight |
|---|---|
| $SiO_2$ | 40–50 |
| $MgO$ | 20–30 |
| $Al_2O_3$ | 18–28 |

Welds were made under the same conditions, except that the flux of the type used for one weld was modified according to the invention to make a weld of the invention. Such modified flux containing suspended metallics produced a weld of X-ray quality with no porosity. The suspended metallic deoxidizers completely suppressed the gassing of the weld arc metal caused by added rust. In contrast, the conventional composition used for making a weld developed gross porosity-forming characteristics.

Welding Conditions

Welding current _____ 550 amps. A.C.
Welding voltage _____ 30 volts.
Wire feed speed _____ 20 in./min.
Welding wire _____ Oxweld No. 29 steel, 5/32 in. dia.

Welding was done over a uniformly distributed layer of rust (iron oxide) 1.5 g. of rust per 10 in. of weld seam.

It is re-emphasized that a principal object of the invention is to achieve suspension of evenly dispersed metal particles which will not agglomerate. Such objective has been achieved, see FIG. 7. As a result of the invention, the industry can now realize for the first time the advantage of direct addition of deoxidizers to the molten bath by controlling the time and the temperature and constituency and the size of the metal additions so as to eliminate the difficulties that were encountered in the previously described direct-addition attempts.

What is claimed is:

1. Method of suspending metallic deoxidizers in submerged-melt arc welding composition, which comprises mixing crushed ferro-silicon particles with calcium fluoride, fusing such mix, solidifying the so-fused material, crushing such solid, and adding such crushed solid material as a late furnace addition to molten welding composition just before pouring the latter, and pouring the molten composition containing such particles before the latter agglomerates, which results in uniform dispersion of particles of metallic deoxidizers throughout the fused welding composition.

2. Method as defined by claim 1, in which the mix of ferro-silicon particles and calcium fluoride is fused at a temperature of about 2,600° F. and the molten welding composition is at a temperature of about 2200° F. when such late addition of crushed solid material is added thereto.

3. Method as defined by claim 1, in which the mix of ferro-silicon particles and calcium fluoride is fused at a temperature of about 2600° F. and the molten welding composition is at a temperature of about 2600° F. when such late addition of crushed solid material is added thereto.

4. Method of making flux for arc welding which comprises, suspending metallic deoxidizers in submerged-melt arc welding composition of the manganese silicate, modified calcium silicate, manganese aluminum silicate, and magnesium aluminum silicate types, by mixing crushed ferro-silicon particles with calcium fluoride, fusing such mix, solidifying the so-fused material, crushing such solid, and adding such crushed solid material as a late furnace addition to the molten welding composition just before pouring the latter, which results in uniform dispersion of particles of metallic deoxidizers throughout the fused welding composition.

5. Process of forming fused deoxidizing addition material for arc welding compositions which comprises mixing crushed ferro-silicon particles with calcium fluoride, fusing the mix at 2600° F., and then crushing the solidified mix.

6. Method of suspending metallic deoxidizing material in submerged-melt welding composition of the manganese silicate, modified calcium silicate, manganese aluminum silicate, and magnesium aluminum silicate types which comprises adding metallic ferro-silicon deoxidizing material in the form of powder the particles of which are freely separable from one another, as late furnace addition to the molten welding composition just before pouring the latter, and pouring the molten composition containing such particles before the latter agglomerates, which results in uniform dispersion of particles of metallic deoxidizers comprising ferro-silicon throughout the fused welding composition.

7. A metal arc welding composition of the manganese silicate, modified calcium silicate, manganese aluminum silicate, and magnesium aluminum silicate types consisting essentially of solid particles each of which is composed of microscopically small spheres comprising ferro silicon distributed throughout a solid matrix composed of material consisting essentially of metal oxides, metal silicates, and mixtures thereof, so that such composition is effective to produce sound welds on steel work containing iron oxide including surface scale and inclusions encountered in metal arc welding characterized in that the suspended metallic additions comprise about 1% to 6% of the composition.

References Cited in the file of this patent

UNITED STATES PATENTS

| | | |
|---|---|---|
| 2,043,960 | Jones et al. | June 9, 1936 |
| 2,308,194 | Miller | Jan. 12, 1943 |
| 2,811,434 | Maklebust | Oct. 29, 1957 |
| 2,855,289 | Bowden | Oct. 7, 1958 |
| 2,909,642 | Landis | Oct. 20, 1959 |
| 2,927,990 | Johnson | Mar. 8, 1960 |

OTHER REFERENCES

The Welding Encyclopedia, 12th edition, pages 666–670, 1947.